US008415966B2

(12) United States Patent  
Kim et al.

(10) Patent No.: US 8,415,966 B2
(45) Date of Patent: Apr. 9, 2013

(54) LIQUID CRYSTAL DISPLAY DEVICE AND INSPECTION METHOD THEREOF

(75) Inventors: Dong-Wook Kim, Yongin (KR); Dong-Hoon Lee, Yongin (KR); Kyoung-Ho Yang, Yongin (KR); Chul-Ho Kim, Yongin (KR); Young-Bae Jung, Yongin (KR); Ji-Suk Lim, Yongin (KR); Hyun-Woo Kim, Yongin (KR); Jun-Young Lee, Yongin (KR); Su-Bok Jin, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 168 days.

(21) Appl. No.: 12/971,075

(22) Filed: Dec. 17, 2010

(65) Prior Publication Data

US 2011/0279746 A1 Nov. 17, 2011

(30) Foreign Application Priority Data

May 13, 2010 (KR) ........................ 10-2010-0044905

(51) Int. Cl.
*G01R 31/26* (2006.01)
(52) U.S. Cl.
USPC ................................ 324/760.01; 324/760.02
(58) Field of Classification Search ........................ None
See application file for complete search history.

(56) References Cited

U.S. PATENT DOCUMENTS

| 7,429,970 B2* | 9/2008 | Tsai et al. ........................ 345/87 |
| 2004/0032278 A1* | 2/2004 | Orii et al. ...................... 324/765 |
| 2006/0279313 A1* | 12/2006 | Fujita et al. ................... 324/765 |
| 2010/0110324 A1* | 5/2010 | Chang ............................. 349/54 |

FOREIGN PATENT DOCUMENTS

| KR | 1020060084201 A | 7/2006 |
| KR | 10-2006-0133836 A | 12/2006 |
| KR | 10-2007-0010567 A | 1/2007 |
| KR | 1020080041842 A | 5/2008 |

OTHER PUBLICATIONS

Korean Notice of Allowance issued on Dec. 27, 2011 in connection with Korean Patent Application Serial No. 10-2010-0044905 and Request for Entry of the Accompanying Office Action attached herewith.

The Korean Office action issued by Korean Patent Office on Jul. 15, 2011, corresponding to KR 10-2010-0044905 and Request for Entry attached herewith.

* cited by examiner

*Primary Examiner* — Vinh Nguyen
(74) *Attorney, Agent, or Firm* — Robert E. Bushnell, Esq.

(57) ABSTRACT

The embodiment is to provide a liquid crystal display device capable of detecting malfunctions. The liquid crystal display device includes pixels configured to be connected to scan lines and data lines, data pads electrically connected to the data lines, a data integrated circuit supplying data signals to the data lines through the data pads, first data transistors coupled to the data pads, and second data transistors coupled to the data lines. The first data transistors are disposed on the data integrated circuit and the second data transistors are separated from the data integrated circuit.

17 Claims, 4 Drawing Sheets

LIQUID CRYSTAL DISPLAY DEVICE AND INSPECTION METHOD THEREOF

CLAIM OF PRIORITY

This application makes reference to, incorporates the same herein, and claims all benefits accruing under 35 U.S.C. §119 from an application earlier filed in the Korean Intellectual Property Office on 13 May 2010 and there duly assigned Serial No. 10-2010-0044905.

BACKGROUND OF THE INVENTION

1. Field of the Invention

The embodiment relates to a liquid crystal display device and an inspection method thereof, and more particularly, to a liquid crystal display device and an inspection method thereof that are capable of detecting malfunctions.

2. Description of the Related Art

The liquid crystal display (LCD) device displays images by controlling light transmittance ratio of liquid crystal cells disposed in the form of matrix on a liquid crystal panel according to data signals. To achieve this, the liquid crystal display device includes a liquid crystal panel having liquid crystal cells and a drive circuit to drive the liquid crystal cells.

The LCD panel includes an upper substrate and a lower substrate. The upper substrate includes a red color filter, a green color filter and a blue color filter, and a black matrix formed between the color filters. A common electrode is formed on the color filters. The lower substrate includes thin film transistors (TFT) formed at each of the liquid crystal cells, pixel electrodes formed to be connected to the TFT, and wire electrodes formed to be connected to the TFT.

The liquid crystal panel is produced through a processing procedure, and goes through an inspection process to detect short and open of scan lines and data lines, and malfunctions of the liquid crystal cells after the completion of the liquid crystal panel. The liquid crystal panel includes a first shorting bar connected to each of the data lines and a second shorting bar connected to each of the scan lines for the inspection process. Short and open of lines of liquid crystal display device and malfunctions of the liquid crystal cells are detected with supply of fixed inspection signals to the first shorting bar and/or the second shorting bar.

Data transistors are formed between data pads, which supplies data signals to the data lines, and the first shorting bar. The data transistors are disposed on an overlapped area with data integrated circuits, electrically connect data pads with the first shorting bar in the inspection process, and electrically isolate the data pads from the first shorting bar in other processes. In the same manner, gate transistors are formed between the second shorting bar and gate pads, and electrically connect the gate pads with the second shorting bar during the inspection process.

On the other hand, the data transistors supply a signal with a predetermined frequency as the inspection signal to check an abnormality of the liquid crystal cells (i.e., lighting inspection), and are formed to have at least a predetermined channel width as the result. In this case, there is a disadvantage that the data transistors are not formed at the data integrated circuits, which are gradually downsized, and the overlapped area of the panel.

To overcome the disadvantage, the data transistors can be formed at outer areas which are not overlapped with the data integrated circuits. At this time, the data transistors are electrically connected to the data lines without passage of the data pads. However, in the event that the data transistors are directly connected to the data lines, there is a disadvantage that malfunctions of connection lines (i.e., fan-out part) between data pads and data lines is not detected.

SUMMARY OF THE INVENTION

The embodiment is to provide a liquid crystal display device and inspection method thereof that are capable of detecting malfunctions of connection lines regardless of downsizing of data integrated circuits.

According to one aspect of the embodiment, there is provided the liquid crystal display device including a plurality of scan lines, a plurality of data lines, a plurality of pixels for displaying an image, a plurality of data pads, a data integrated circuit, a plurality of first data transistors, and a plurality of second data transistors. The pixels are coupled to the scan lines and the data lines. Each of the data lines are electrically connected to one of the data pads. The data integrated circuit supplies data signals to the data lines through the data pads. Each of the data pads is connected to one of the first data transistors, and the first data transistors overlap with the data integrated circuit. Each of the data lines is connected to one of the second data transistors, and the second data transistors are separated from the data integrated circuit.

The second data transistors may have a channel width wider than a channel width of the first data transistors.

The liquid crystal display device may further include a first data inspection line, a second data inspection line, a first data control line, and a second data control line. The first data inspection line may be connected to a first electrode of an i-th one of the first data transistors and connected to a first electrode of an i-th one of the second data transistors. The second data inspection line may be connected to a first electrode of an (i+1)-th one of the first data transistors and connected to a first electrode of an (i+1)-th one of the second data transistors. The first data control line may be connected to a gate electrode of each of the first data transistors. The second data control line may be connected to a gate electrode of each of the second data transistors.

During a first inspection period, a first control signal may be supplied to the first data control line, and during a second inspection period, a second control signal may be supplied to the second data control line. The first data transistors may turn on whenever the first control signal is applied to the first data transistors, and the second data transistors may turn on whenever the second control signal is applied to the second data transistors. The first inspection period may not overlap with the second inspection period. During the first inspection period, a first inspection signal may be supplied to the first data inspection line and to the second data inspection line. The first inspection signal may include a DC voltage.

During the second inspection period, a second inspection signal may be supplied to the first data inspection line and to the second data inspection.

During a period except the first and second inspection periods, the first data transistors and the second data transistors may be turned off.

The liquid crystal display device may further include a first data inspection line, a second data inspection line, a first data control line, and a second data control line. The first data inspection line may be connected to a first electrode of an i-th one of the second data transistors. The second data inspection line may be connected to a first electrode of an (i+1)-th one of the second data transistors. First electrodes of the first data transistors may be connected to one of the first data inspection line and the second data inspection line. The first data control line may be connected to a gate electrode of each of the first data transistors. The second data control line may be connected to a gate electrode of each of the second data transistors. All of the first electrodes of the first data transistors may be connected to the first data inspection line. All of the first electrodes of the first data transistors may be connected to the second data inspection line.

According to another aspect of the embodiment, there is provided the inspection method of a liquid crystal display device, which includes a data integrated circuit and a plurality of data lines. The method includes turning on first data transistors during a first inspection period, detecting a disconnection of the connection lines by supplying a first inspection signal to the connection lines through the first data transistors, turning on second data transistors during a second inspection period, and detecting a malfunction of liquid crystal pixels by supplying a second inspection signal to the data lines through the second data transistors. The data integrated circuit supplies data signals to the data lines through data pads and connection lines. The first data transistors overlap with the data integrated circuit. The first data transistors are coupled to the data pads. The connection lines are disposed between the data pads and data lines. The second data transistors are coupled to the data lines. The first inspection period does not overlap with the second inspection period.

The first inspection signal may include a DC voltage. The second data transistors may be configured not to overlap with the data integrated circuit. The second data transistors may have a channel width wider than a channel width of the first data transistors.

The inspection method may further include supplying a selection signal to scan lines to select the liquid crystal pixels during the second inspection period. Each of the liquid crystal pixels may be coupled to one of the data lines and one of the scan lines.

According to the liquid crystal display device and the inspection method thereof, there is a advantage that the liquid crystal display device is able to detect malfunctions of connection lines by using of the first data transistors that is configured to be overlapped with a data integrated circuit, and is able to detect malfunctions of liquid crystal cells by using of the second data transistors that is configured at an outer area to be un-overlapped with the data integrated circuit. Here, the first data transistors are able to be configured with a possible minimum size due to detecting only malfunctions of connection lines, and thus are able to be disposed to be overlapped with a data circuit.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
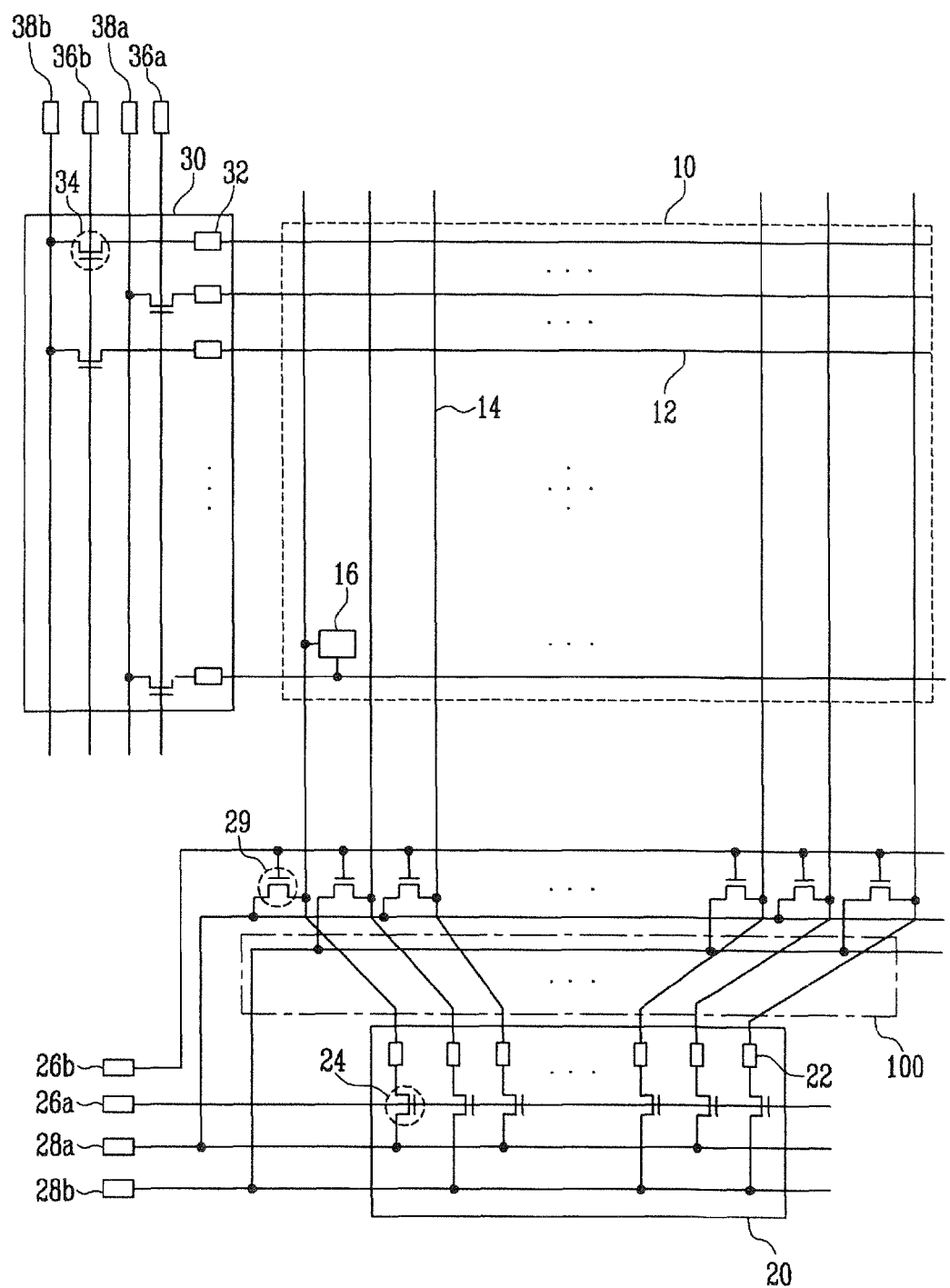
FIG. 1 is a plan view showing a liquid crystal display device according to an embodiment of the present invention.

The liquid crystal display (LCD) device displays images by controlling light transmittance ratio of liquid crystal cells disposed in the form of matrix on a liquid crystal panel according to data signals. To achieve this, the liquid crystal display device includes a liquid crystal panel having liquid crystal cells and a drive circuit to drive the liquid crystal cells. The LCD panel includes an upper substrate and a lower substrate. The upper substrate includes a red color filter, a green color filter and a blue color filter, and a black matrix formed between the color filters. A common electrode is formed on the color filters. The lower substrate includes thin film transistors (TFT) formed at each of the liquid crystal cells, pixel electrodes formed to be connected to the TFT, and wire electrodes formed to be connected to the TFT. The liquid crystal panel is produced through a processing procedure, and goes through an inspection process to detect short and open of scan lines and data lines, and malfunctions of the liquid crystal cells after the completion of the liquid crystal panel.

Hereinafter, certain exemplary embodiments according to the present invention will be described with reference to the accompanying drawings. Here, when a first element is described as being coupled to a second element, the first element may be not only directly coupled to the second element but may also be indirectly coupled to the second element via a third element. Further, some of the elements that are not essential to the complete understanding of the invention are omitted for clarity. Also, like reference numerals refer to like elements throughout.

Hereinafter, the preferable embodiments, in which the skilled one in the field can easily perform the present invention, will be described in more detail with reference to FIG. 1 to FIG. 3.

Figure 4:
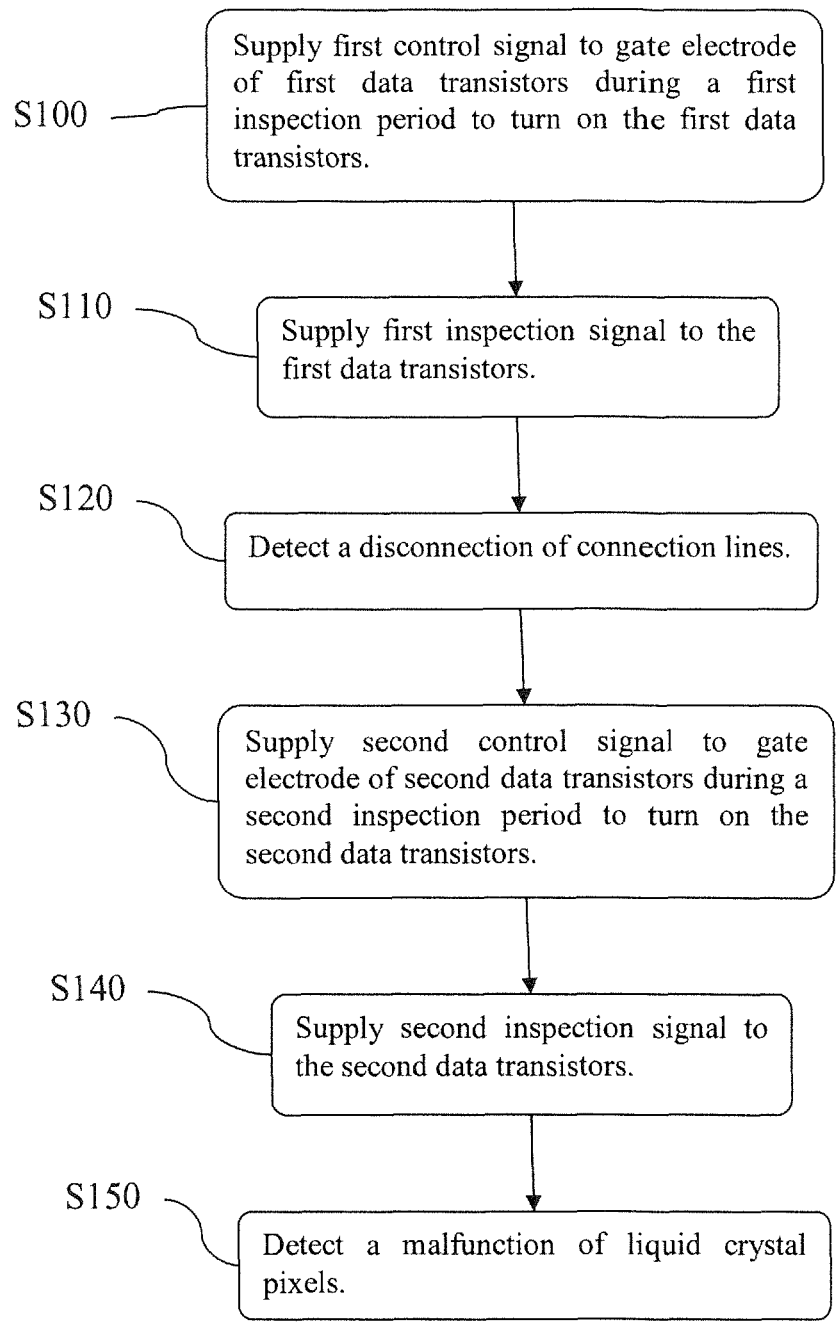
FIG. 4 is a flowchart showing an inspection method according to still another embodiment of the present invention.

FIG. 1 illustrates a liquid crystal display device according to one embodiment of the present invention. FIG. 1 illustrates a data integrated circuit 20 and a gate circuit 30 to facilitate the description of the present invention, but the embodiment of the present invention will not be limited thereto. FIG. 4 is a flowchart showing an inspection method according to still another embodiment of the present invention. The inspection processes will be described while explaining the elements of the liquid crystal display device.

Referring to FIG. 1, the liquid crystal display device according to one embodiment of the present invention includes a pixel unit 10 that has data lines 14 and scan lines 12, which cross each other, a data integrated circuit 20 that drives the data lines 14, and a gate integrated circuit 30 that drives the scan lines 12.

The pixel unit 10 includes liquid crystal cells 16 which are arranged in a matrix form (two-dimensional array), and each of the liquid crystal cells 16 is located around intersection of one of the data lines 14 and one of the scan lines 12. Each of the liquid crystal cells 16 includes a thin film transistor (TFT) and a pixel electrode which is connected to the TFT. The liquid crystal cells 16 are selected when scan signals are supplied to the scan lines 16, and are supplied with data signals from the data lines 14. After that, the liquid crystal cells 16 allow images to be displayed on the pixel unit 10 by controlling light transmittance ratio corresponding to the data signals. The liquid crystal cell 16 may be referred to as a liquid crystal pixel 16 or a pixel 16 of the pixel unit 10.

The gate integrated circuit 30 is configured to be connected to gate pads 32. The gate integrated circuit 30 supplies the scan signals to the gate line 14 through the gate pads 32. The data pads 32 may be mounted on the gate integrated circuit 30 to transmit signals from the gate integrated circuit 30.

The data integrated circuit 20 is configured to be connected to data pads 22. The data integrated circuit 20 supplies the data signals to the data lines 14 through the data pads 22. The data pads 22 may be mounted on the data integrated circuit 20 to transmit signals from the data integrated circuit 20.

In addition, one embodiment of the present invention includes a first data inspection line 28a, a second data inspection line 28b, a first data control line 26a, a second data controlling 26b, first data transistors 24, and second transistors 29, in order to detect malfunctions of the liquid crystal cells 16 and the connection lines 100.

The first data inspection line 28a is connected to a first electrode (one of a drain electrode and a source electrode) of an i-th transistor of the first data transistors 24 and an i-th transistor of the second data transistors 29. The first data inspection line 28a transmits a first inspection signal, which is supplied from an external device during a first inspection period, to the i-th first data transistor 24 and the i-th second data transistor 29. Herein, if a source electrode of a transistor is referred to as a first electrode, a drain electrode of the transistor is referred to as a second electrode, and vice versa.

The second data inspection line 28b is connected to a first electrode of an (i+1)-th transistor of the first data transistors 24 and an (i+1)-th transistor of the second data transistors 29. The second data inspection line 28b transmits a second inspection signal, which is supplied from an external device during a second inspection period, to the (i+1)-th first data transistor 24 and the (i+1)-th second data transistor 29. Herein, the (i+1)-th transistor is a transistor disposed next to the i-th transistor, and 'i' is a natural number. One example of this arrangement is shown in FIG. 1. The first data inspection line 28a is connected to first electrodes of the first, third, fifth, etc transistors of the first data transistors 24, and is connected to first electrodes of the first, third, fifth, etc transistors of the second data transistors 29. The second data inspection line 28b is connected to first electrodes of the second, fourth, sixth, etc transistors of the first data transistors 24, and is connected to first electrodes of the second, fourth, sixth, etc transistors of the second data transistors 29. In other words, the connection of the first data transistors 24 alternate between the first and second data inspection lines 28a and 28b, and the connection of the second data transistors 29 also alternate between the first and second data inspection lines 28a and 28b.

The first data control line 26a is connected to gate electrodes of the first data transistors 24. The first data control line 26a supplies a first control signal to the gate electrode of each of the first data transistors 24 during the first inspection period. The first data transistors 24 are turned on whenever the first control signal is applied to the gate electrodes of the first data transistor.

The second data control line 26b is connected to gate electrodes of the second data transistors 29. The second data control line 26b supplies a second control signal to the second data transistors 29 during the second inspection period. The second data transistors 29 are turned on whenever the second control signal is applied to the gate electrodes of the second data transistor. The first inspection period does not overlap with the second inspection period.

The first data transistors 24 are configured to overlap with the data integrated circuit 20. In other words, the first data transistors 24 may be disposed below the data integrated circuit 20, but is disposed to overlap with the data integrated circuit 20. The second electrode of the first data transistor 24 is connected to one of the data pads 22, and the first electrode of the first data transistor 24 is connected to the first inspection line 28a or to the second inspection line 28b. The first data transistors 24 is used to inspect disconnection of the connection line 100 (i.e., the disconnection malfunctions of a fan-out), which is disposed between the data pads 22 and the data lines 14.

More specifically, during the first inspection period, the first control signal is supplied to the first data control line 26a, and the first inspection signal is supplied to the first data inspection line 28a and the second data inspection line 28b. The first data transistors 24 are turned on when the first control signal is supplied to the first data control line 26a (S100 in FIG. 4). The first inspection signal (i.e., a direct current (DC) voltage) is supplied to the data lines 14 through the connection lines 100 when the first data transistors 24 are turned on (S110). In this configuration, the disconnection of the connection lines 100 is inspected by sensing electric current supplied through the data lines 14 (S120).

Meanwhile, the first data transistors 24 transmit the first inspection signal, which is not capable of driving the liquid crystal cells 16, to the connection line 100. In this case, the first data transistors 24 are able to be configured into a minimum size, which can be disposed on the data integrated circuit 20. Therefore, the first data transistors 24 may be securely configured at an area overlapped with the data integrated circuit 20.

The second data transistors 29 are configured to be positioned in an area, which is not overlapped with the data integrated circuit 20. For example, the second data transistors 29 may be positioned around ends of the data lines 14, which are disposed at the upper part of the connection lines 100, as shown in FIG. 1. The second electrode of the second data transistor 29 is connected to one of the data lines 14, and the first electrode of the second data transistor 29 is connected to the first data inspection line 28a or the second data inspection line 28b. The second data transistors 29 are used to inspect an abnormal operation of the liquid crystal cells 16 and short of the connection lines 100.

More specifically, during the second inspection period, which does not overlap with the first inspection period, the second control signal is supplied to the second data control line 26b, and the second inspection signal is supplied to the first data inspection line 28a and the second data inspection line 28b. The second inspection signal may include signals to inspect an abnormality of the liquid crystal cells and signals to check short of connection lines 100.

The second data transistors 29 are turned on when the second control signal is supplied to the second data control line 26b (S130 in FIG. 4). The second inspection signal is supplied to the data lines 14 when the second data transistors 29 are turned on (S140). In this period, whether or not the operations of the liquid crystal cells 16 are abnormal and the connecting liens 100 are short is inspected (S150). More specifically, a selecting signal of the liquid crystal cells 16 is supplied to the scan lines 12 during the second inspection period. At this time, the second inspection signal is supplied to the liquid crystal cells 16 which are selected by the selecting signal. Through this process, whether or not the operations of the liquid crystal cells 16 are abnormal can be inspected.

In addition, during the second inspection period, the first data inspection line 28a and the second data inspection line 28b can be supplied with the second inspection signal at different time. At this time, whether or not the connecting liens 100 are short can be inspected by sensing current flowing to the data lines 16.

On the other hand, the second data transistors 29 are supplied with the second inspection signal having a predetermined frequency in correspondence to charge and discharge of the liquid crystal cells 16. Thus, the channel width of the second data transistors 29 is set up wider than the channel width of the first data transistors 24.

For the embodiment of the present invention as mentioned above, whether or not the liquid crystal cells 16 and the connection lines 100 are abnormal may be inspected by using the first transistors, which are overlapped with the data circuit, and the second data transistors, which are not overlapped with the data circuit. In this case, the first data transistors are able to configured to overlap with the data integrated circuit, and accordingly, the disconnection malfunctions are able to be securely detected. Also, one embodiment of the present invention is able to securely detect whether or not the liquid crystal cells 16 are abnormal by use of the second transistors.

One embodiment of the present invention further comprises a first gate inspection line 38a, a second gate inspection line 38b, a first gate control line 36a and a second gate control line 36b to supply the selecting signal to scan lines 12 during the second inspection period.

The first gate inspection line 38a is connected to a first electrode of an (i+1)-th transistor of gate transistors 34. The first gate inspection line 38a transmits a first inspection signal supplied from an external device to the (i+1)-th gate transistor 34.

The second gate inspection line 38b is connected to a first electrode of an i-th transistor of the gate transistors 34. The second gate inspection line 38b transmits a second inspection signal supplied from the external device to the i-th gate transistor 34 during the inspection period. In other words, the connection of the gate transistors 34 alternate between the first and second gate inspection lines 38a and 38b.

The first gate control line 36a is connected to a gate electrode of the (i+1)-th transistor of the gate transistors 34. The first gate control line 36a supplies a first control signal to the (i+1)-th gate transistors 34. The (i+1)-th gate transistor 34 is turned on whenever the first control signal is applied to the gate electrode of the (i+1)-th gate transistor 34.

The second gate control line 36b is connected to the gate electrode of the i-th transistor of the gate transistors 34. The second gate control line 36b transmits a second control signal to the i-th gate transistor 34. The i-th gate transistor 34 is turned on whenever the second control signal is applied to the gate electrode of the i-th gate transistor 34. Herein, the (i+1)-th gate transistor is a transistor disposed next to the i-th gate transistor, and 'i' is a natural number. The first electrode of the gate transistor may be a source electrode or a drain electrode. If a source electrode of a gate transistor is referred to as a first electrode, a drain electrode of the gate transistor is referred to as a second electrode, and vice versa.

The gate transistors 34 are configured to be overlapped with the gate integrated circuit 30. In other words, the gate transistors 34 are disposed or mounted on the gate integrated circuit 30. The second electrode of the gate transistors 34 is connected to the gate pads 32, and the first electrode of the gate transistor 34 is connected to the first gate inspection line 38a or the second gate inspection line 38b. The gate transistors 34 are turned on during the second inspection period, and supply a selecting signal to scan lines. The gate transistors 34 are able to be downsized due to supply of the selecting signal only to the scan lines 12, and are able to be configured to be overlapped with the gate integrated circuit 30.

Meanwhile, the above-described gate transistors 34 are explained to be overlapped with the gate integrated circuit 30, but the embodiment of the present invention will not be limited thereto. For example, the gate transistors 34 can be configured to be adjacent to the gate integrated circuit 30 in the event that the gate integrated circuit 30 is packed into a panel. In the embodiment of the present invention, in fact circuit organization to supply the selection signal to the scan lines 12 can be selected as one of a variety of circuits that are now known.

Figure 2:
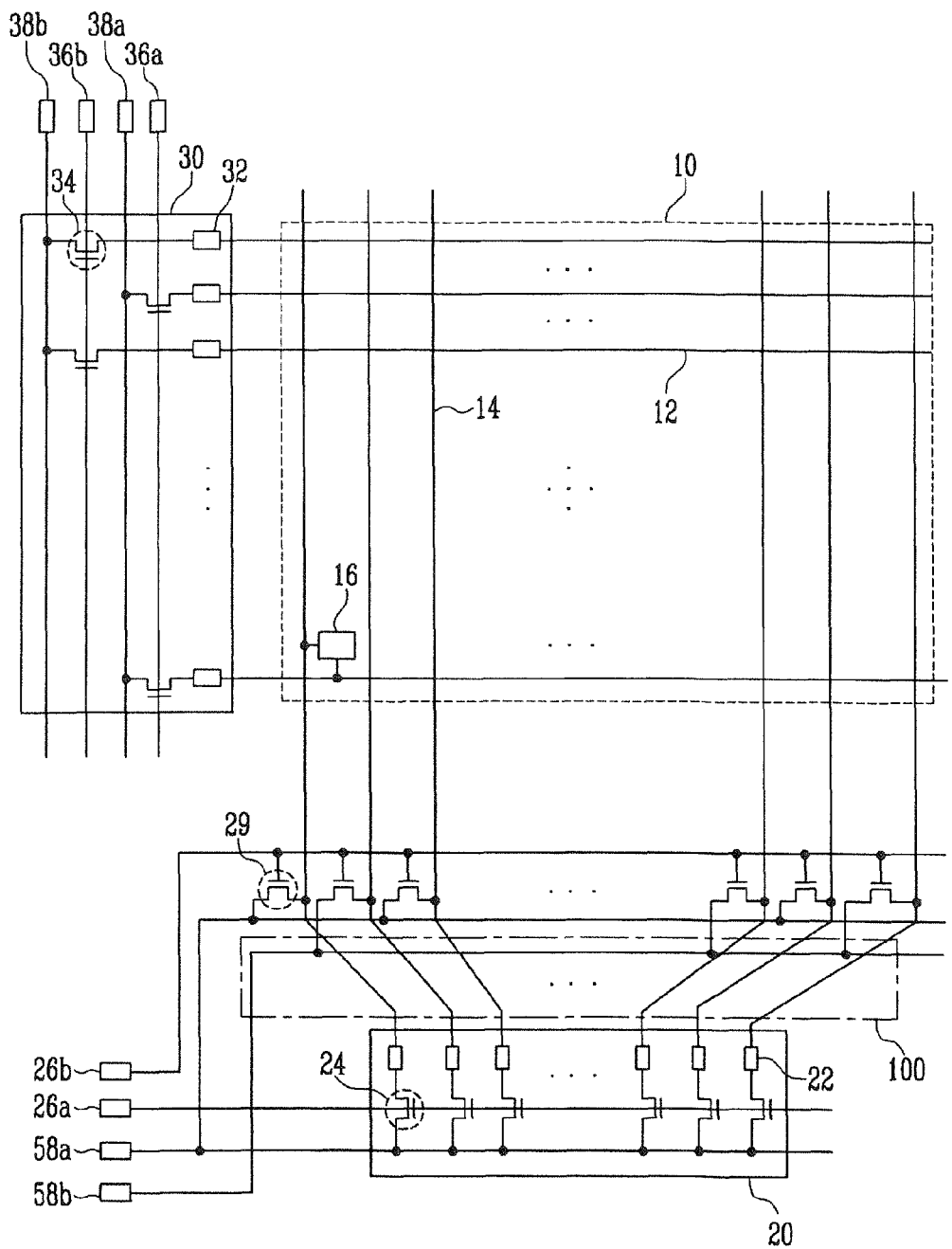
FIG. 2 is a plan view showing a liquid crystal display device according to another embodiment of the present invention.
Figure 3:
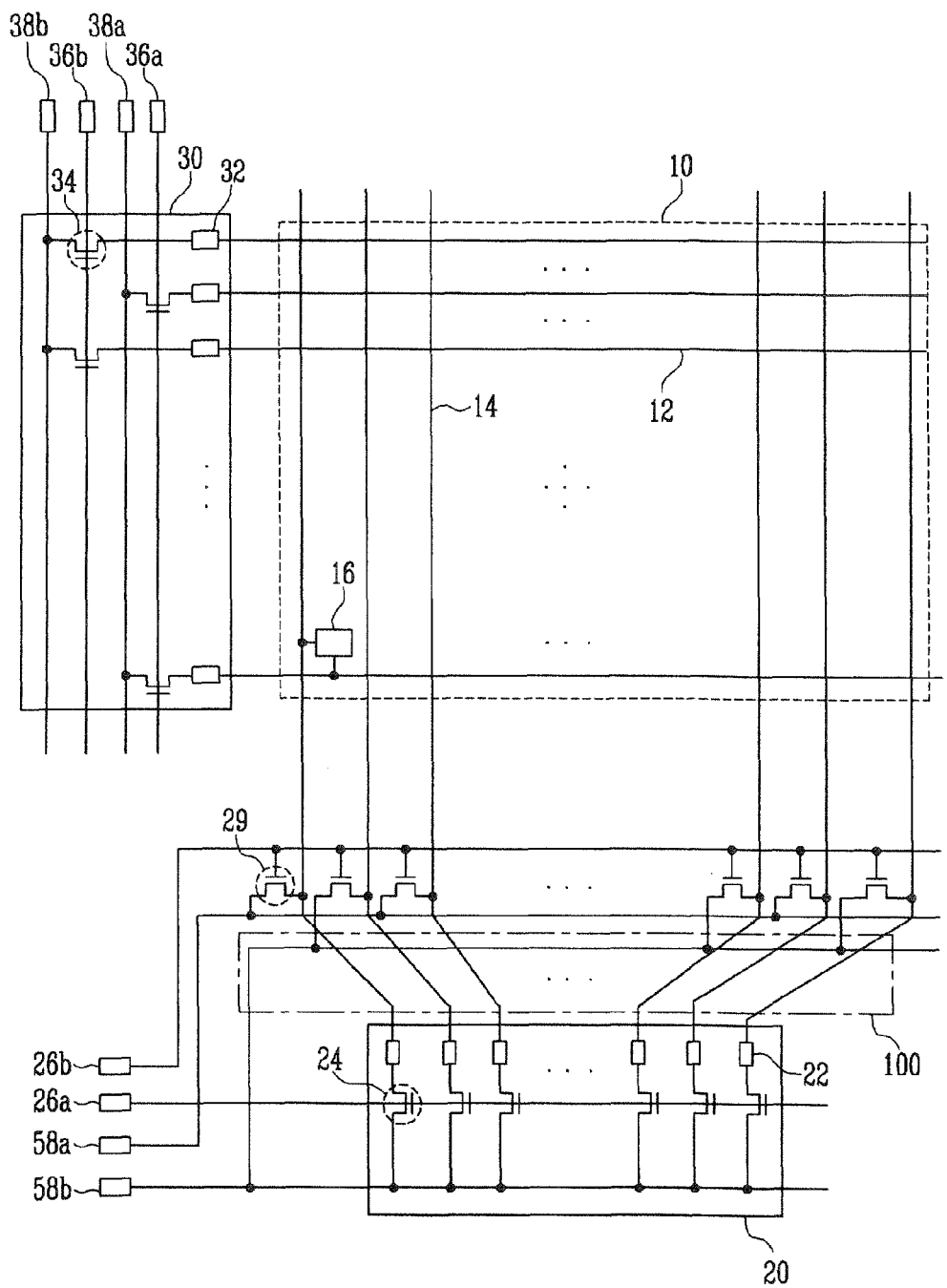
FIG. 3 is a plan view showing a liquid crystal display device according to still another embodiment of the present invention.

FIG. 2 illustrates a liquid crystal display device according to the second embodiment of the present invention. At description of FIG. 2, the same parts as FIG. 1 use the same number, and the description thereof will be omitted.

Referring FIG. 2, in the second embodiment of the present invention, the second electrode of the first data transistors 24 is connected to the data pads 22, and the first electrode is connected to the first data inspection line 58a. That is, in the second embodiment of the present invention, all of the first electrodes of the first data transistors 24 are connected to the first data inspection line 58a.

Because the first data transistors 24 are used to detect disconnection malfunctions of connection lines 100, i.e., by simple supply of only a dc current, the first electrodes of the first data transistors 24 may be connected to the first data inspection line 58a. As shown at FIG. 3, all of the first electrodes of the first data transistors 24 may be configured to be connected to the second data inspection line 58b.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A liquid crystal display device comprising:
a plurality of scan lines;
a plurality of data lines;
a plurality of pixels for displaying an image, the pixels coupled to the scan lines and the data lines;
a data integrated circuit supplying data signals to the data lines;
a plurality of data pads mounted on the data integrated circuit, each of the data lines electrically connected to one of the data pads, the data signals supplied from the data integrated circuit to the data lines through the data pad;
a plurality of first data transistors, each of the data pads being connected to a second electrode of one of the first data transistors, a first electrode of the one of the first data transistors connected to a first data inspection line, the first data transistors disposed on the data integrated circuit; and
a plurality of second data transistors, each of the data lines being connected to a second electrode of one of the second data transistors, a first electrode of the one of the second data transistors connected to the first data inspection line, the second data transistors not disposed on the data integrated circuit.

2. The liquid crystal display device as claimed in claim 1, wherein the second data transistors has a channel width wider than a channel width of the first data transistors.

3. The liquid crystal display device as claimed in claim 1, wherein the first data inspection line is connected to a first electrode of an i-th one of the first data transistors and is connected to a first electrode of an i-th one of the second data transistors, the liquid crystal display device further comprising:

a second data inspection line connected to a first electrode of an (i−1)-th one of the first data transistors and connected to a first electrode of an (i+1)-th one of the second data transistors;
a first data control line connected to a gate electrode of each of the first data transistors; and
a second data control line connected to a gate electrode of each of the second data transistors.

4. The liquid crystal display device as claimed in claim 3, wherein during a first inspection period, a first control signal is supplied to the first data control line, and during a second inspection period, a second control signal is supplied to the second data control line, the first data transistors turning on whenever the first control signal is applied to the first data transistors, the second data transistors turning on whenever the second control signal is applied to the second data transistors, the first inspection period not overlapping with the second inspection period.

5. The liquid crystal display device as claimed in claim 4, wherein during the first inspection period, a first inspection signal is supplied to the first data inspection line and to the second data inspection line.

6. The liquid crystal display device as claimed in claim 5, wherein the first inspection signal includes a DC voltage.

7. The liquid crystal display device as claimed in claim 4, wherein during the second inspection period, a second inspection signal is supplied to the first data inspection line and to the second data inspection line.

8. The liquid crystal display device as claimed in claim 4, wherein during a period except the first and second inspection periods, the first data transistors and the second data transistors are turned off.

9. The liquid crystal display device as claimed in claim 1, wherein the first data inspection line is connected to a first electrode of an i-th one of the second data transistors, the liquid crystal display device further comprising:
a second data inspection line connected to a first electrode of an (i+1)-th one of the second data transistors, first electrodes of the first data transistors being connected to one of the first data inspection line and the second data inspection line;
a first data control line connected to a gate electrode of each of the first data transistors; and
a second data control line connected to a gate electrode of each of the second data transistors.

10. The liquid crystal display device as claimed in claim 9, wherein all of the first electrodes of the first data transistors are connected to the first data inspection line.

11. The liquid crystal display device as claimed in claim 9, wherein all of the first electrodes of the first data transistors are connected to the second data inspection line.

12. An inspection method of a liquid crystal display device comprising:
turning on first data transistors during a first inspection period, the liquid crystal display device including a data integrated circuit and a plurality of data lines, a plurality of data pads mounted on the data integrated circuit, connection lines disposed between the data pads and the data lines, the data integrated circuit supplying data signals to the data lines through the data pads and the connection lines, the first data transistors disposed on the data integrated circuit, the first data transistors coupled to the data pads;
supplying a first inspection signal to the connection lines through the first data transistors to detect a disconnection of the connection lines;
turning on second data transistors during a second inspection period, the second data transistors coupled to the data lines, the first inspection period not overlapping with the second inspection period; and
supplying a second inspection signal to the data lines through the second data transistors to detect a malfunction of pixels of the liquid crystal display device.

13. The inspection method as claimed in claim 12, wherein the first inspection signal includes a DC voltage.

14. The inspection method as claimed in claim 12, wherein the second data transistors are not disposed on the data integrated circuit.

15. The inspection method as claimed in claim 12, wherein the second data transistors has a channel width wider than a channel width of the first data transistors.

16. The inspection method as claimed in claim 12, further comprising:
supplying a selection signal to scan lines to select pixels of the liquid crystal display device during the second inspection period to detect the malfunction of the pixels of the liquid crystal display device, each of the pixels of the liquid crystal display device being coupled to one of the data lines and one of the scan lines.

17. The inspection method as claimed in claim 12, further comprising:
sensing electric current supplied through the data lines to detect the disconnection of the connection lines.

* * * * *